United States Patent
Kim et al.

(10) Patent No.: US 9,794,844 B2
(45) Date of Patent: Oct. 17, 2017

(54) DEVICE FOR SUPPORTING ON/OFF OF SMALL BASE STATION IN WIRELESS COMMUNICATION NETWORK

(71) Applicants: LG ELECTRONICS INC., Seoul (KR); SOGANG UNIVERSITY RESEARCH FOUNDATION, Seoul (KR)

(72) Inventors: Youngtae Kim, Anyang-si (KR); Gilsoo Lee, Seoul (KR); Hongseok Kim, Seoul (KR); Byounghoon Kim, Anyang-si (KR)

(73) Assignees: LG ELECTRONICS INC., Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 15 days.

(21) Appl. No.: 14/908,453

(22) PCT Filed: Nov. 11, 2013

(86) PCT No.: PCT/KR2013/010161
§ 371 (c)(1),
(2) Date: Jan. 28, 2016

(87) PCT Pub. No.: WO2015/016429
PCT Pub. Date: Feb. 5, 2015

(65) Prior Publication Data
US 2016/0198381 A1    Jul. 7, 2016

Related U.S. Application Data

(60) Provisional application No. 61/859,785, filed on Jul. 30, 2013.

(51) Int. Cl.
*H04W 52/02* (2009.01)
*H04B 7/0456* (2017.01)
(Continued)

(52) U.S. Cl.
CPC ........ *H04W 36/165* (2013.01); *H04B 7/0456* (2013.01); *H04W 16/32* (2013.01);
(Continued)

(58) Field of Classification Search
None
See application file for complete search history.

(56) References Cited

U.S. PATENT DOCUMENTS

| | | |
|---|---|---|
| 2010/0173630 A1 | 7/2010 | Han et al. |
| 2010/0234039 A1 | 9/2010 | Kwon et al. |
| 2011/0216683 A1 | 9/2011 | Ju et al. |

FOREIGN PATENT DOCUMENTS

EP    2512171    10/2012

OTHER PUBLICATIONS

Hitachi Ltd., "Efficient Small Cell Operation," 3GPP TSG-RAN WG1 Meeting #72, R1-130342, Jan. 2013, 3 pages.
(Continued)

*Primary Examiner* — Diane Lo
(74) *Attorney, Agent, or Firm* — Lee Hong Degerman Kang Waimey

(57) ABSTRACT

The present invention includes a plurality of access points (APs); a plurality of user equipments (UEs); and a macro cell, wherein the macro cell is configured to receive feedback including a first matrix comprising connection information between identifiers of the plurality of APs and the plurality of UEs, generate a second matrix including information on a specific AP to be activated, the specific AP being determined on the basis of the first matrix, and broadcast the generated second matrix.

9 Claims, 13 Drawing Sheets

(51) Int. Cl.
*H04W 36/16* (2009.01)
*H04W 16/32* (2009.01)

(52) U.S. Cl.
CPC ....... *H04W 52/02* (2013.01); *H04W 52/0206* (2013.01); *Y02B 60/50* (2013.01)

(56) References Cited

OTHER PUBLICATIONS

PCT International Application No. PCT/KR2013/010161, Written Opinion of the International Searching Authority dated Apr. 25, 2013, 17 pages.

FIG. 7

| 1-bit feedback | N-bit feedback |
|---|---|
| $A_{ij} = \{1, 0\}$<br>- Only represents the connectivity<br>- Highly depends on the possible cell range | $A_{ij} = \{throughput\}$<br>- Throughput can be quantized by using the adaptive modulation and coding (AMC) |
| $A = \begin{pmatrix} & AP_1 & AP_2 & AP_3 & AP_4 & AP_5 & AP_6 & \cdots & AP_{J-1} & AP_J \\ 0 & 0 & 0 & 1 & 1 & 1 & \cdots & 0 & 0 \\ 0 & 1 & 1 & 1 & 0 & 0 & \cdots & 0 & 0 \\ 0 & 1 & 1 & 1 & 1 & 0 & \cdots & 0 & 0 \\ 0 & 0 & 0 & 0 & 1 & 1 & \cdots & 1 & 0 \\ \vdots & \vdots & \vdots & \vdots & \vdots & & & \vdots & \vdots \\ 0 & 0 & 0 & 0 & 0 & 1 & \cdots & 1 & 0 \\ 1 & 1 & 1 & 1 & 1 & 0 & \cdots & 0 & 0 \end{pmatrix} \begin{matrix} UE_1 \\ UE_2 \\ UE_3 \\ UE_4 \\ \vdots \\ UE_{I-1} \\ UE_I \end{matrix}$ | $A = \begin{pmatrix} AP_1 & AP_2 & AP_3 & AP_4 & AP_5 & AP_6 & \cdots & AP_{J-1} & AP_J \\ 0 & 0 & 1 & 7 & 9 & 1 & \cdots & 0 & 0 \\ 0 & 1 & 5 & 1 & 0 & 0 & \cdots & 0 & 0 \\ 1 & 3 & 7 & 9 & 6 & 1 & \cdots & 0 & 0 \\ 0 & 0 & 0 & 0 & 1 & 3 & \cdots & 1 & 0 \\ \vdots & \vdots & \vdots & \vdots & \vdots & & & \vdots & \vdots \\ 0 & 0 & 0 & 0 & 0 & 1 & \cdots & 1 & 0 \\ 1 & 4 & 6 & 5 & 1 & 0 & \cdots & 0 & 0 \end{pmatrix} \begin{matrix} UE_1 \\ UE_2 \\ UE_3 \\ UE_4 \\ \vdots \\ UE_{I-1} \\ UE_I \end{matrix}$ |

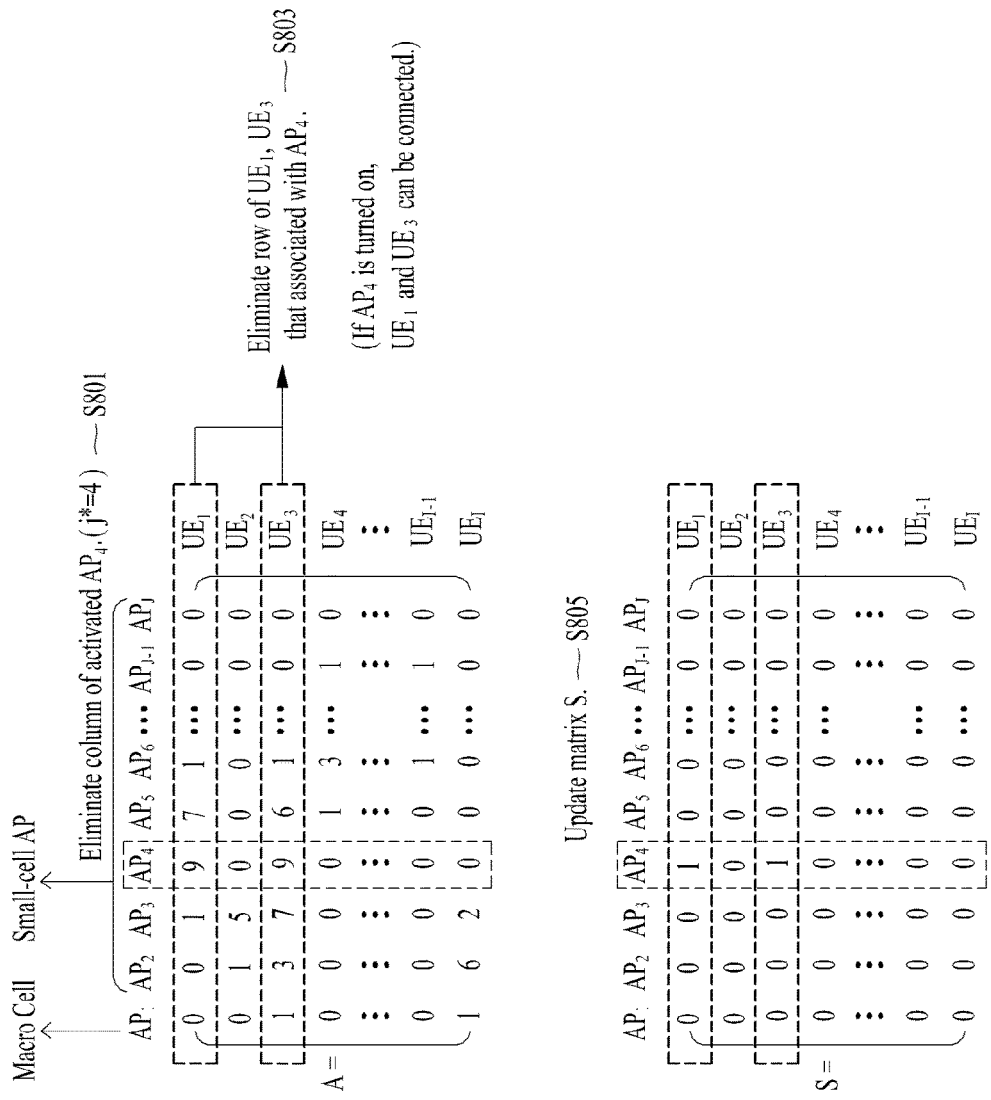

FIG. 9

$$A = \begin{pmatrix} & AP_1 & AP_2 & AP_3 & AP_4 & AP_5 & AP_6 & \cdots & AP_{J-1} & AP_J \\ & 0 & 0 & 1 & 7 & 9 & 1 & \cdots & 0 & 0 \\ & 0 & 1 & 5 & 1 & 0 & 0 & \cdots & 0 & 0 \\ & 1 & 3 & 7 & 9 & 6 & 1 & \cdots & 0 & 0 \\ & 0 & 0 & 0 & 0 & 1 & 3 & \cdots & 1 & 0 \\ & \vdots & \vdots & \vdots & \vdots & \vdots & \vdots & & \vdots & \vdots \\ & 0 & 0 & 0 & 0 & 0 & 1 & \cdots & 1 & 0 \\ & 1 & 4 & 6 & 5 & 1 & 0 & \cdots & 0 & 0 \end{pmatrix} \begin{matrix} UE_1 \\ UE_2 \\ UE_3 \\ UE_4 \\ \vdots \\ UE_{I-1} \\ UE_I \end{matrix}$$

FIG. 10

$$A = \begin{pmatrix} & AP_1 & AP_2 & AP_3 & AP_4 & AP_5 & AP_6 & \cdots & AP_{J-1} & AP_J \\ & 0 & 0 & 1 & 7 & 9 & 1 & \cdots & 0 & 0 \\ & 0 & 1 & 5 & 1 & 0 & 0 & \cdots & 0 & 0 \\ & 1 & 3 & 7 & 9 & 6 & 1 & \cdots & 0 & 0 \\ & 0 & 0 & 0 & 0 & 1 & 3 & \cdots & 1 & 0 \\ & \vdots & \vdots & \vdots & \vdots & \vdots & \vdots & & \vdots & \vdots \\ & 0 & 0 & 0 & 0 & 0 & 1 & \cdots & 1 & 0 \\ & 1 & 4 & 6 & 5 & 1 & 0 & \cdots & 0 & 0 \end{pmatrix} \begin{matrix} UE_1 \\ UE_2 \\ UE_3 \\ UE_4 \\ \vdots \\ UE_{I-1} \\ UE_I \end{matrix}$$

FIG. 14
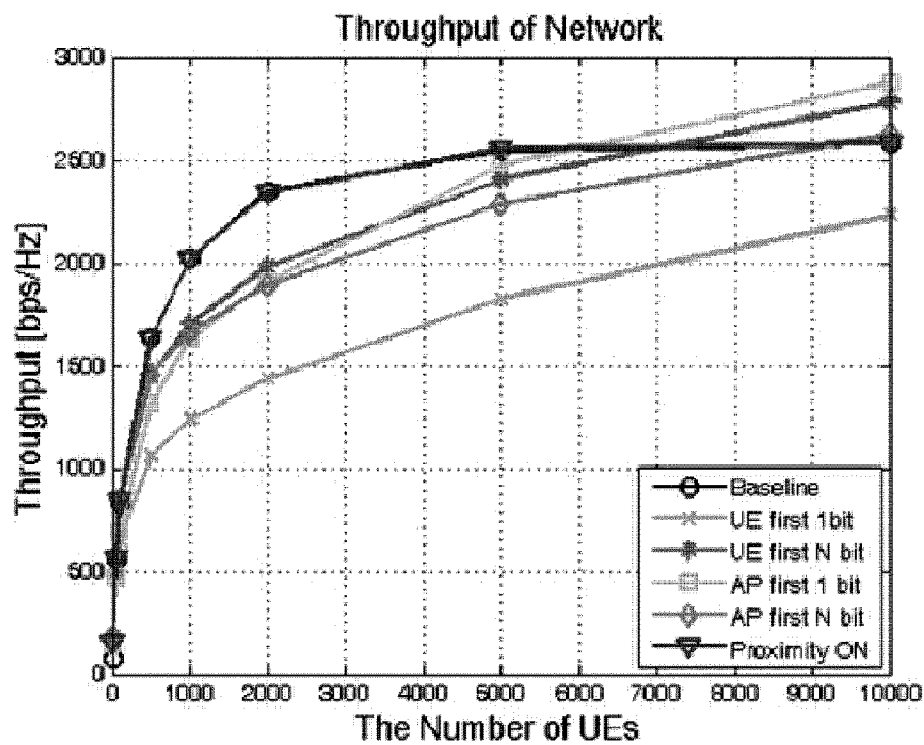
(a)
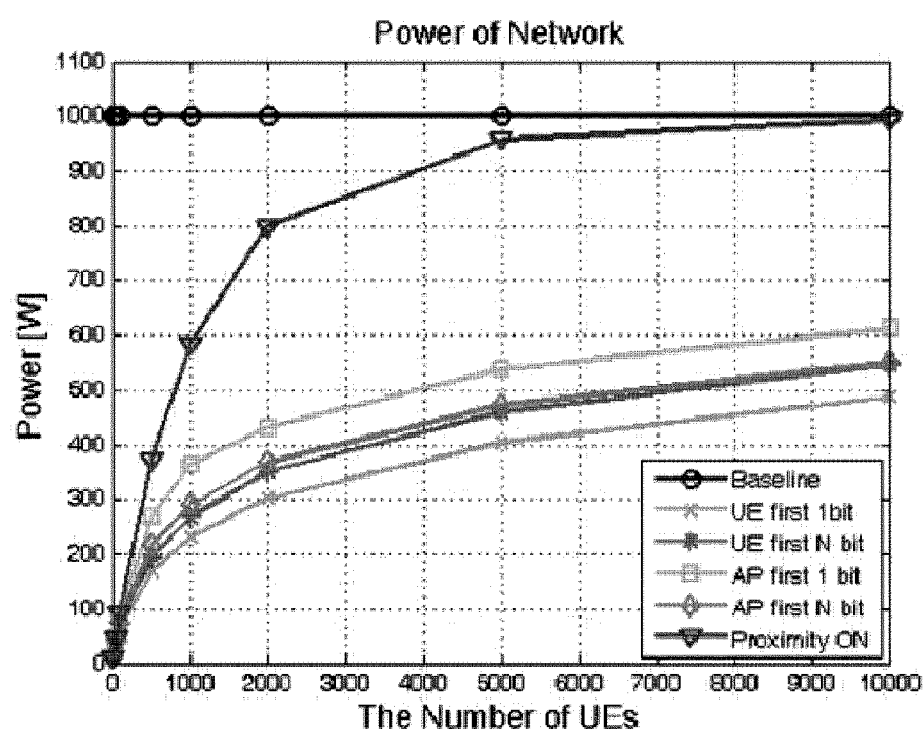
(b)

FIG. 15
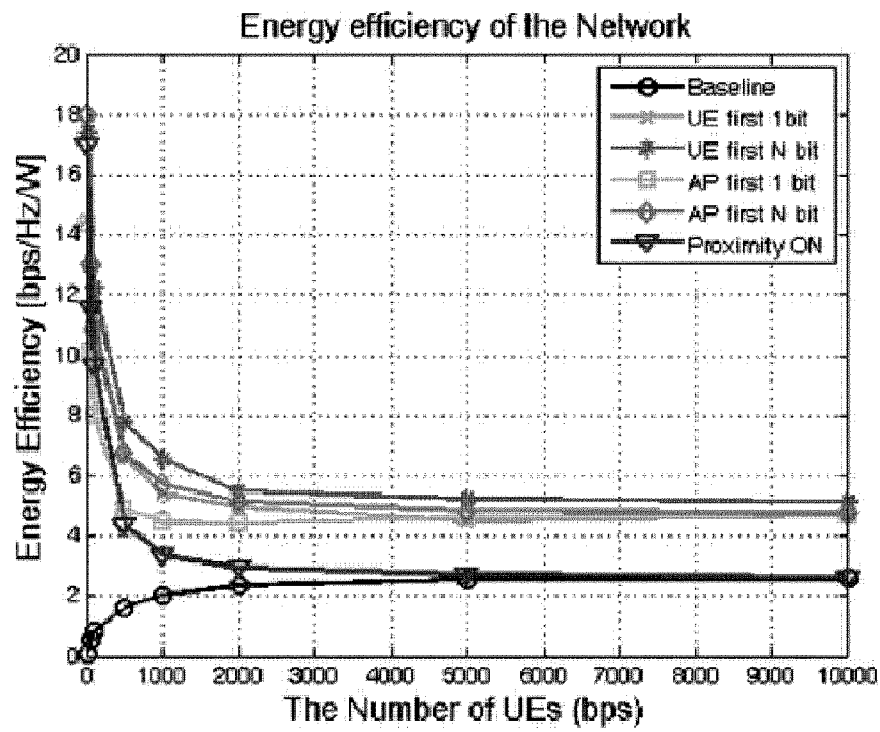
(a)
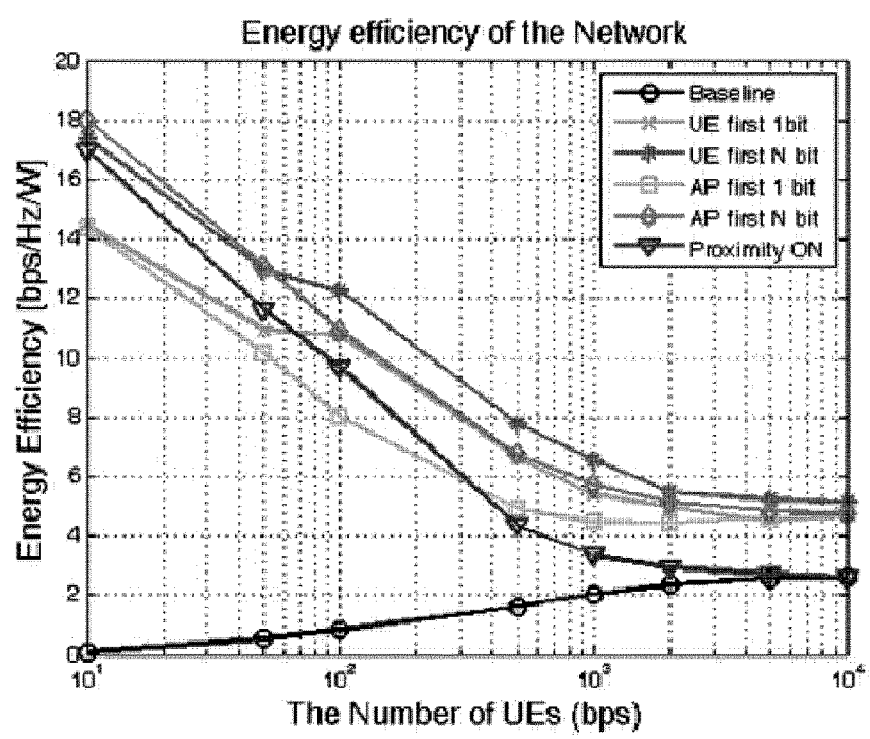
(b)

DEVICE FOR SUPPORTING ON/OFF OF SMALL BASE STATION IN WIRELESS COMMUNICATION NETWORK

CROSS-REFERENCE TO RELATED APPLICATIONS

This application is the National Stage filing under 35 U.S.C. 371 of International Application No. PCT/KR2013/010161, filed on Nov. 11, 2013, which claims the benefit of U.S. Provisional Application No. 61/859,785, filed on Jul. 30, 2013, the contents of which are all hereby incorporated by reference herein in their entirety.

TECHNICAL FIELD

The present invention relates to a wireless communication system, and more particularly, to a device for supporting on-off of a small base station.

BACKGROUND ART

A current cellular network has been evolved from a legacy macro cell to a heterogeneous small cell. It is expected that a base station having small coverage, such as a small cell, will be evolved toward an ultra-dense network (UDN) of which coverage becomes small to reach several tens of meters or several meters Small base stations that configure such a UDN may be a set of base stations called a femto cell (Fcell), a pico cell (Pcell) or a small cell.

FIG. 1 illustrates a UDN comprised of a macro cell and a plurality of small access points (APs). In a structure of the UDN illustrated in FIG. 1, one macro cell may serve all user equipments. Also, the macro cell serves to prevent a coverage hole from being generated in a cellular network. For example, the UDN becomes an overlaid network where a plurality of small APs are overlapped to configure coverage and at the same time a macro cell, which manages all the APs, exists to overlap the small APs. This is to prevent service drop such as call drop from being generated, wherein the call drop is caused as a user moves to a coverage hole in the middle of receiving a service, in which real time feature is important, such as voice call.

The macro cell may be used to process control information of all networks. On the other hand, the UDN may mainly be used for capacity boost, and its coverage may be overlapped between small APs. Also, since a considerably large of small APs may be provided, a plurality of small APs having no connected user equipment may exist. The small APs having no connected user equipment may dynamically be powered off depending on a space-time use pattern, whereby energy consumption at the base station can be reduced.

DISCLOSURE

Technical Problem

An object of the present invention is to provide a technique that minimizes power consumption by allowing a small cell controller (SCC) located at a macro base station to efficiently turn on/off a power of a small AP in accordance with assistance of a user equipment and at the same time minimizes network throughput deterioration felt by a user.

It will be appreciated by persons skilled in the art that the objects that could be achieved with the present invention are not limited to what has been particularly described hereinabove and other objects that the present invention could achieve will be more clearly understood from the following detailed description.

Technical Solution

In one aspect of the present invention to solve the above object, a wireless communication system comprises a plurality of access points (APs); a plurality of user equipments (UEs); and a macro cell, wherein the macro cell is configured to receive feedback including a first matrix comprising connection information between identifiers of the plurality of APs and the plurality of UEs, generate a second matrix including information on a specific AP to be activated, the specific AP being determined on the basis of the first matrix, and broadcast the generated second matrix.

Moreover, at least one of the plurality of APs is activated per predetermined period and configured to transmit a beacon message and identify the generated second matrix. Also, at least one of the plurality of APs performs turn-off if it does not correspond to the specific AP included in the generated second matrix.

Moreover, each of the plurality of UEs is configured to receive the beacon message from the plurality of APs and feed a report message, which includes at least one of connectivity and transportable speed, back to each AP. Furthermore, each of the plurality of UEs is configured to identify whether to receive the beacon message of the AP and determine whether to perform handover if the beacon message can be received.

Moreover, the second matrix is characterized in that a value simultaneously corresponding to both a first AP of which transportable throughput to the plurality of UEs is maximum and a first UE associated with the first AP is set to 1 based on the first matrix.

Moreover, the second matrix is characterized in that a value simultaneously corresponding to both a second UE that may be connected to a minimum number of APs and a second AP that may be connected to a maximum number of UEs among APs connected to the second UE is set to 1 based on the first matrix.

Moreover, the second matrix is characterized in that a value corresponding to an AP that provides the highest throughput to a specific UE is set to 1 based on the first matrix.

Moreover, the macro cell is configured to transmit a message indicating handover when broadcasting the generated second matrix.

Advantageous Effects

According to the present invention, a small cell controller (SCC) located at a macro base station can minimize power consumption by efficiently turning on/off a power of a small AP and at the same time network throughput deterioration felt by a user can be minimized.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 7 illustrates an example of a report message fed back from a UE;

FIG. 8 is a reference diagram illustrating a method for determining a matrix S from a matrix A in accordance with a column-row elimination system according to the present invention;

FIG. 9 is a reference diagram illustrating an AP first activating procedure;

FIG. 10 is a reference diagram illustrating a procedure of first considering a UE;

FIG. 14 illustrates network throughput based on the number of UEs and a change of network power consumption; and FIG. 15 illustrates a change of network energy efficiency based on the number of UEs.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following detailed description is given under the assumption that 3GPP LTE mobile communication systems are used. However, the description may be applied to any other mobile communication system except for specific features inherent to the 3GPP LTE systems.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), and an advanced mobile station (AMS). Also, it is assumed that a base station refers to a random node of a network terminal, such as Node B, eNode B, and an access point (AP), which performs communication with the user equipment.

In a mobile communication system, a user equipment may receive information from a base station through a downlink and transmit information to the base station through an uplink. The information that the user equipment transmits or receives includes data and various types of control information. There are various physical channels according to the types and usages of information that the user equipment transmits or receives.

A 3GPP LTE (3rd Generation Partnership Project Long Term Evolution) (hereinafter, referred to as LTE) and LTE-Advanced (hereinafter, referred to as LTE-A) communication systems will be described as exemplary mobile communication systems to which the present invention may be applied.

Figure 1:
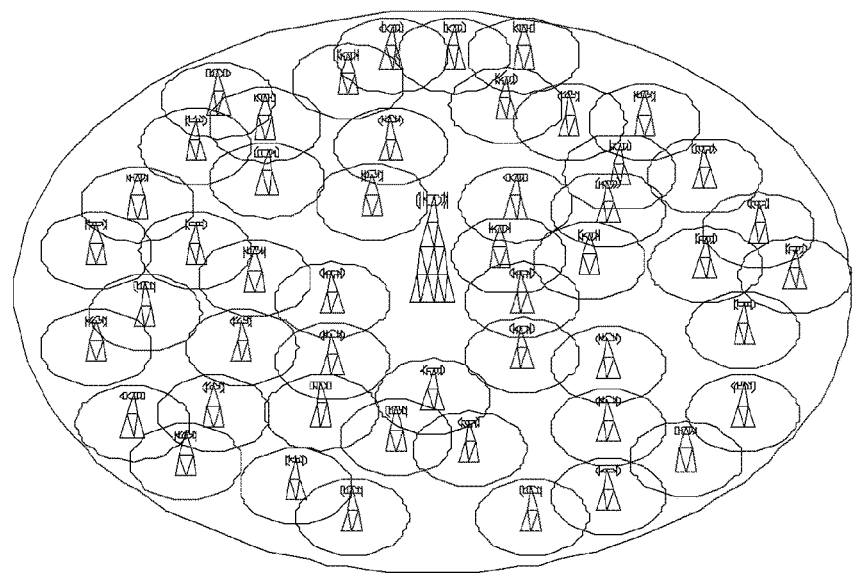
FIG. 1 illustrates a UDN comprised of a macro cell and a plurality of small access points (APs)
Figure 2:
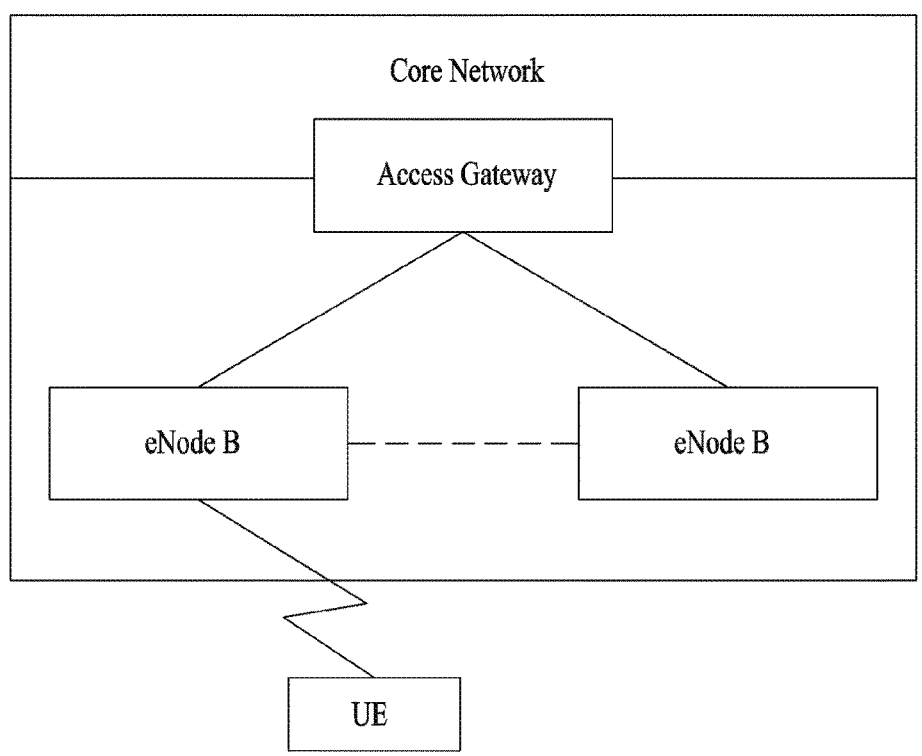
FIG. 2 illustrates a network structure of an E-UMTS as an example of a mobile communication system.

FIG. 2 illustrates a network structure of an E-UMTS as an example of a mobile communication system.

An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 2, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information.

In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Recently, 3GPP has standardized technology subsequent to LTE. In this specification, the technology will be referred to as "LTE-Advanced" or "LTE-A". A main difference between the LTE system and the LTE-A system is a system bandwidth. The LTE-A system aims to support a wideband of up to 100 MHz. To achieve this, the LTE-A system employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in the LTE system. Each frequency block is transmitted using a component carrier.

Figure 3:
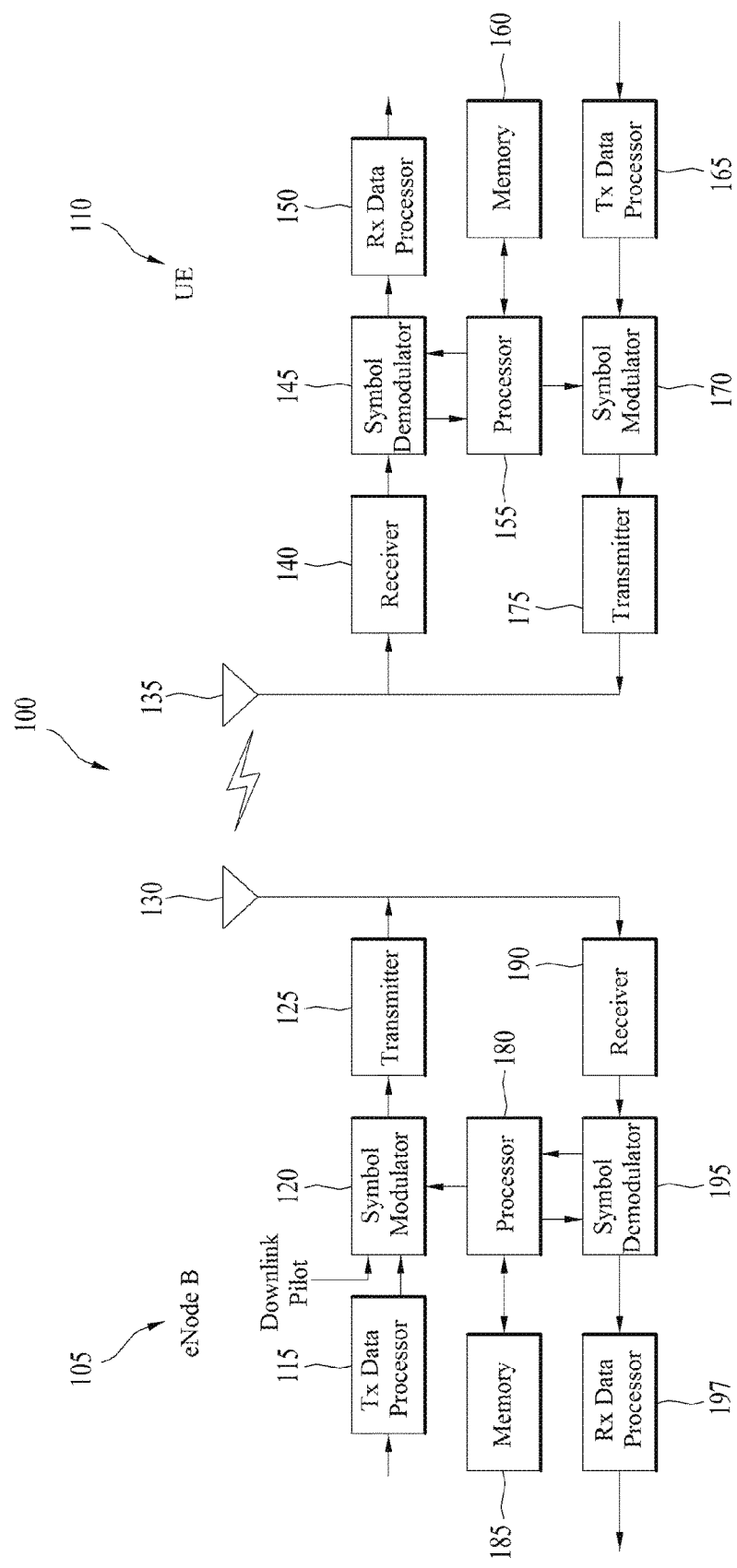
FIG. 3 is a block diagram illustrating configurations of a base station and a user equipment in a wireless communication system according to the present invention.

FIG. 3 is a block diagram illustrating configurations of a base station 105 and a user equipment 110 in a wireless communication system.

Although one base station 105 and one user equipment 110 are shown for simplification of a wireless communication system 100, the wireless communication system 100 may include one or more base stations and/or one or more user equipments.

Referring to FIG. 3, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 297. The user equipment 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although the antennas 130 and 135 are respectively shown in the base station 105 and the user equipment 110, each of the base station 105 and the user equipment 110 includes a plurality of antennas. Accordingly, the base station 105 and the user equipment 110 according to the present invention support a multiple input multiple output (MIMO) system. Also, the base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the user equipment through the antenna 130.

In the configuration of the user equipment 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the user equipment 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the user equipment 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the user equipment 110 by processing the data symbol estimation values.

The processors 155 and 180 of the user equipment 110 and the base station 105 respectively command (for example, control, adjust, manage, etc.) the operation at the user equipment 110 and the base station 105. The processors 155 and 180 may respectively be connected with the memories 160 and 185 that store program codes and data. The memories 160 and 185 respectively connected to the processor 180 store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180. Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

The term, base station used in the present invention may refer to a "cell or sector" when used as a regional concept. A serving base station (or serving cell) may be regarded as a base station which provides main services to UEs and may transmit and receive control information on a coordinated multiple transmission point. In this sense, the serving base station (or serving cell) may be referred to as an anchor base station (or anchor cell). Likewise, a neighboring base station may be referred to as a neighbor cell used as a local concept.

The present invention suggests a method for activating a small AP only required in accordance with distribution of UEs without turning on all small APs located in a macro cell. The present invention based on the 3GPP LTE will be described based on each of small AP, User Equipment (UE), and SCC. In the wireless communication system, On/Off procedure of small base stations according to the present invention is as follows.

In the wireless communication system, small APs enter a deactivated state by themselves after a certain time passes in a state that there is no connected UE.

The deactivated small APs periodically become a semi-active state and transmit a beacon message, perform a procedure previously set for small APs, and return to the deactivated state again if they do not correspond to a state previously defined. Moreover, it is preferable that the beacon message includes ID of small AP.

The UE that has received the beacon message feeds a report message as to whether the beacon message has been received back to the small AP connected thereto or the macro base station, wherein the report message is transmitted to a small cell controller (SCC) located in the macro base station. Moreover, the UE may feed a transportable speed estimated from signal strength back together with the report message as to whether the beacon message has been received. Alternatively, the UE may not perform such a report by considering its moving speed. At this time, finite-state machine (FSM) may be used.

The SCC may know spatial distribution of the UEs on the basis of the report transmitted from the UEs. Therefore, the SCC may determine which small AP should be powered on by simultaneously considering energy efficiency and network throughput, and then may broadcast the determined information by carrying the corresponding information in an AP-ON message.

The small AP of the semi-active state listens to the AP-ON message, checks its activated bit from the AP-ON message field and then determines activation/deactivation. At this time, the UE may quickly wake up the small AP without through the SCC. That is, the small AP may be woken up by responding to an activation request of the UE, which is transmitted through an uplink channel (for example, PUSCH).

1. Procedure of Small AP (Access Point) in the Present Invention

Table 1 for carrying out the aforementioned present invention illustrates a procedure previously set for the aforementioned small AP.

TABLE 1

```
while ( ) {
   while (activated state) {
      if (if there is no connected UE)
         (small APs are deactivated by themselves after a certain time
         passes.)
      else (activated state is maintained.)
   }
   while (deactivated state) {
      periodically activated temporarily per time T_b.
      beacon (APID related message) broadcast.
      AP-ON message transmitted from UE is received observing an uplink
      channel.
      Alternatively, AP-ON message is received from SCC.
      if (bit activated from AP-ON message is 1)
         {activated}
      else (deactivated state is maintained.)
   }
}
```

In Table 1, APID (Access Point Identifier) indicates ID inherent to small AP, which is similar to eNodeB Identifier (eNB-ID).

Figure 4:
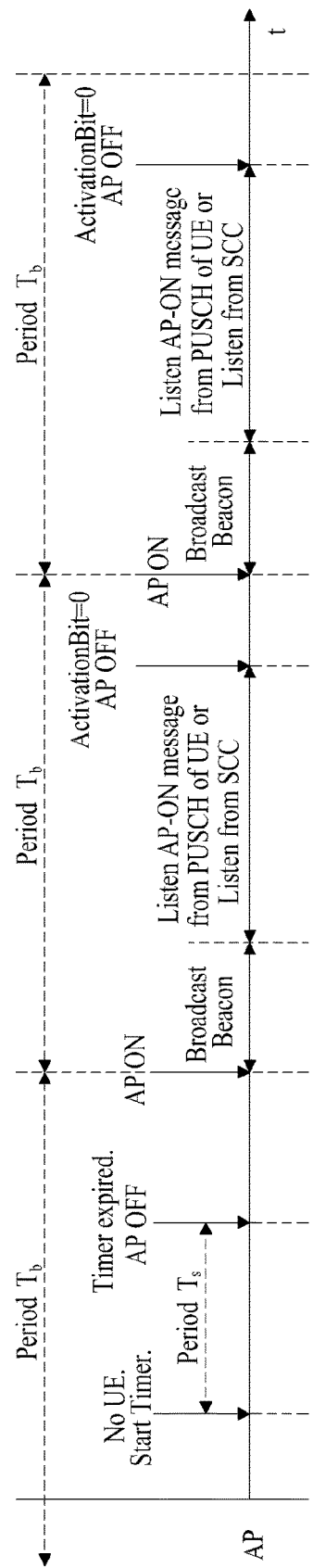
FIG. 4 is a reference diagram illustrating an operation of a small AP.

FIG. 4 is a reference diagram illustrating an operation of a small AP. In FIG. 4, it is assumed that small APs are synchronized and identifies whether a message is received from the SCC per predetermined period of time $T_b$.

The small AP determines deactivation by itself. That is, if there is no UE served by the small AP, the small AP is deactivated by itself by power off after standby as much as a certain period of time Sleep Time (Ts). Also, since the small AP may quickly be driven again unlike the base station of the macro cell, even though the small AP is powered off by itself, the small AP may quickly be switched to the activated state if a new UE enters coverage.

Figure 5:
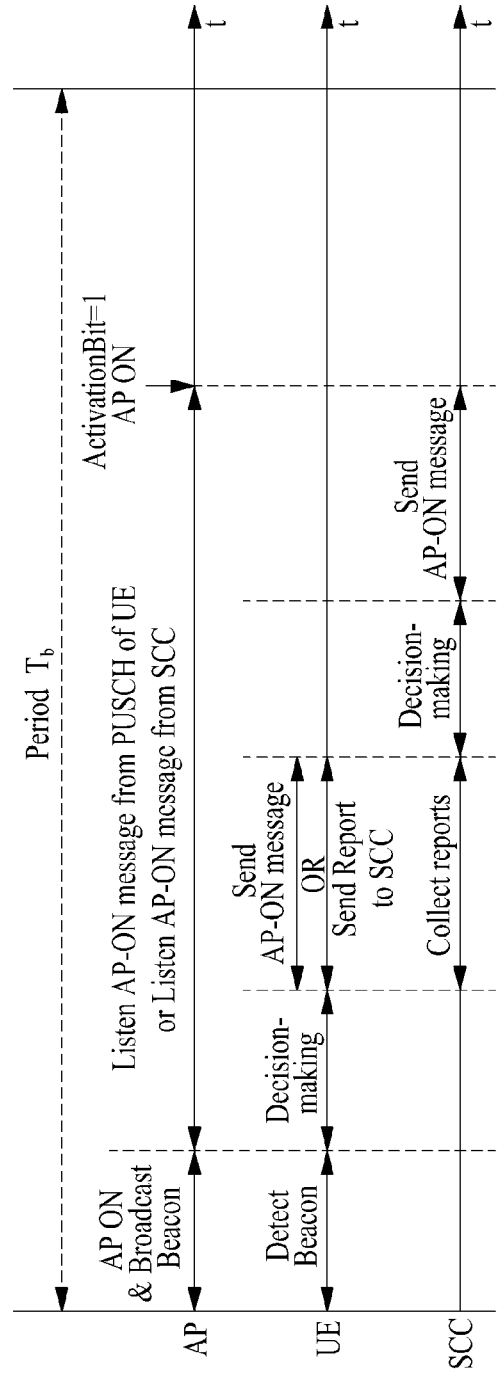
FIG. 5 is a reference diagram illustrating a turned-on procedure of a small AP.

FIG. 5 is a reference diagram illustrating a turned-on procedure of a small AP.

In FIG. 5, a small AP which is powered off is powered on (semi-activated state) by itself per period of time $T_b$ and broadcasts APID to notify UEs located within its coverage of its presence. At this time, a signal transmitted from the small AP to notify the UEs of its presence is referred to as a beacon message, and the small AP transmits the beacon message per period of time $T_b$. In this case, since a length of the period of time (that is, $T_b$) of the beacon message is a parameter related to throughput, it is preferable that the length is determined considering a period of a system information block (SIB) used for cell search in the LTE. For example, the fastest period of the SIB is 80 ms, and $T_b$ may be an integer multiple (for example, 800 ms) of the fastest period of the SIB. In this case, it is advantageous in that the present invention may be applied with maintaining compatibility with the legacy wireless communication system.

The small AP receives the AP-ON message from the SCC connected by the wire or wireless after transmitting the beacon message. Alternatively, the small AP may receive the AP-ON message from the UE through an uplink channel (for example, physical uplink shared channel, PUSCH). Moreover, the small AP checks its activation bit from the AP-ON message received from the SCC or the UE and is activated in accordance with the checked result.

2. Procedure of UE (User Equipment) in the Present Invention

Since the UE can know its mobility and channel strength of the small AP (macro cell), the UE can determine channel quality indicator (CQI) by calculating reference signal received quality (RSRQ) obtained by reference signal received power (RSRP) and received strength signal indicator (RSSI).

The operation of the UE for activating the SCC in the present invention will be described with reference to Table 2.

TABLE 2

Initialization: all UEs are connected to macro cell.
while ( ) {
   Cell search
   State transition (based on FSM)
   Report of CQI of all channels to SCC
   Wait $T_b$
)

As illustrated in Table 2, after receiving the beacon message, the UE feeds a report message, which includes connectivity (for example, expressed by 1 or 0) or transportable speed (for example, transport speed during application of adaptive modulation and coding (AMC)) that may be obtained substantially, back to the SCC.

A finite-state machine (FSM) of feedback timing and handover (HO) of the UE in the present invention will be described with reference to FIG. 6 and Table 3.

TABLE 3

| State | Operation and meaning |
|---|---|
| HO to MC | Handover to macro cell |
| HO to AP$_1$ | Handover to small AP$_1$ |
| Beacon receivable | It means that UE may receive a beacon transmitted from small AP, and in this state, it is expected that UE is proximate to coverage of small AP. |
| In coverage | It identifies whether UE is within coverage of small AP to receive beacon, has been moved to a position closer to small AP before handover, or stays within coverage of small AP for sufficiently long period of time (that is, state not fast moving speed). |

Figure 6:
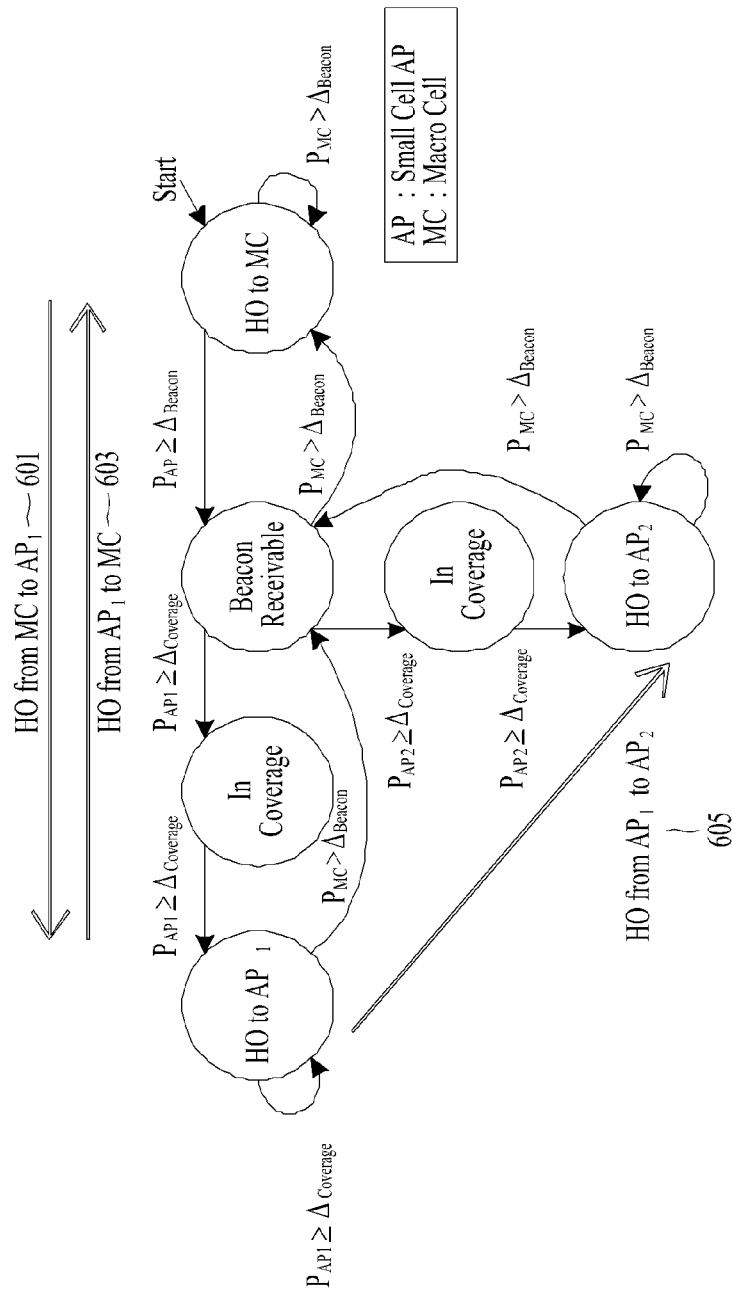
FIG. 6 illustrates a finite-state machine (FSM) for feedback timing and handover (HO) of a UE according to the present invention.

In FIG. 6, the state is changed per period of time $T_b$, and the UE measures channel strength (PMC, PAP) from the macro cell and the small AP per period of time $T_b$ and transmits channel information to the SCC.

Therefore, the SCC notifies the UE of a proper threshold (that is, $\Delta_{Beacon}$ or $\Delta_{Coverage}$), whereby the FSM performs state transition for handover.

That is, in FIG. 6, it is assumed that the UE moves between one macro cell and two small APs with mobility. Three scenarios, that is, i) movement from the macro cell to the small AP1, ii) movement from the small AP1 to the macro cell, and iii) movement from the small AP1 to the small AP2, will be described with reference to FIG. 6.

2.1. Moving Scenario of Handover from Macro Cell of UE (User Equipment) to Small AP1 (S601)

The UE is connected to the macro cell at an 'HO to MC' state. If the UE is within coverage of the small AP1 while moving, channel strength of the small AP1 becomes high. Therefore, the UE performs handover to the small AP1 at the 'HO to AP1' state by sequentially passing through the 'Beacon Receivable' state and the 'In coverage' state.

Since coverage of the small AP is restrictive and it is required to certainly recognize that the UE stays within coverage of the small AP, handover from the macro cell to the small AP is performed through the 'Beacon Recognition' state and the 'In coverage' state.

Also, handover at the macro cell is likely to occur during high speed movement of a vehicle. However, it is preferable that handover is set to bypass instead of handover to the small cell during high speed movement of a vehicle. That is, it is considered that handover occurs through nomadic walking of a user.

2.2. Moving Scenario of UE (User Equipment) from Small AP1 to Macro Cell (S603)

If the UE moves and is outside coverage of the small AP1 to enter coverage of the macro cell, the UE performs handover to the macro cell at the 'HO to MC' state through the 'Beacon Receivable' state.

Since handover from the small AP to the macro cell means that handover to the base station having wider coverage is performed, the handover from the small AP to the macro cell has no difficulty relatively than the handover to the small AP. Therefore, the handover is performed simply through the 'Beacon Recognition' state only.

2.3. Moving Scenario of UE (User Equipment) from Small AP1 to Small AP2 (S605)

If the UE which is within coverage of the small AP1 moves and enters coverage of the small AP2, the UE performs handover to the small AP2 at the 'HO to AP2' state through the 'Beacon Receivable' state and the 'In coverage' state.

In order that the UE performs state transition at the FSM, two thresholds are required as comparison conditions. First of all, the UE compares a beacon threshold $\Delta_{Beacon}$ with channel strength to move from the 'HO to MC' state to the 'Beacon Receivable' state. In this case, the UE considers offset for compensating for a difference in an output power between the macro cell and the small AP when deciding $\Delta_{Beacon}$. And, the UE compares a coverage threshold $\Delta_{Coverage}$ with channel strength to move from the 'Beacon Receivable' state to the 'In coverage' state. $\Delta_{Coverage}$ is determined as $\Delta_{Coverage} > \Delta_{Beacon}$, and is again compared with channel strength to identify whether the UE, which can receive a beacon, actually accesses coverage of the small AP or stays within coverage to enable a high transmission rate.

In this case, handover from the macro cell to the small AP has a state that the UE is prevented from being unnecessarily connected to the small AP when moving quickly through a vehicle, whereas it is determined that the state does not occur in handover from the small AP to the macro cell, whereby the UE may be configured for fast handover to immediately move to the 'Beacon Receivable' state by skipping the 'In Coverage' state. That is, since the macro cell has wide coverage in the handover from the macro cell to the small AP, it is advantageous in that it does not matter that handover occurs slowly. Therefore, data off-loading is preferably required after it is identified that a user is inside coverage of the small AP. On the other hand, since handover from the small AP to the macro cell is required quickly for seamless service due to small coverage of the small AP, the present invention suggests handover based on asymmetric standby time.

In FIG. 6, if the UE waits for $T_b$ of two times from the 'HO to MC' state to the 'HO to AP' state, it may reduce unnecessary handover based on mobility of the UE. That is, a channel state of the small AP is better than that of the macro cell at the time when the UE connected to the macro cell, having fast mobility moves near the small AP. However, since the UE is outside coverage of the small AP before long, the channel state of the macro cell will be better than that of the small AP.

Under the circumstances, if a plurality of small APs pass the UE, a ping-pong effect may occur, in which unnecessary handover is performed repeatedly among various cells. Therefore, the UE having mobility is inside coverage of the small AP for a short time but is more preferably required to be continuously connected to the macro cell. Therefore, in the present invention, to reduce the ping-pong effect, the FSM determines that the UE is inside coverage of the small AP if the UE stays in coverage of the small AP for a time of $3T_b$ or more corresponding to three times of $T_b$, and then handover may be performed.

Also, in the present invention, the UE may directly transmit an activation command to the small AP instead of feeding a report message back to the SCC.

TABLE 4

Initialization: all UEs are connected to the macro cell.
while( ) {
   Cell Search
   State transition (based on FSM)
   AP which will be activated is determined. (proper algorithm is required.)
   AP-ON message is transmitted to small AP through PUSCH.
   Wait $T_b$
}

Referring to Table 4, if the UE receives a beacon message, the UE may be on standby to stay in coverage of the small AP for a time of $T_b$ or more through decision-making based on the FSM. Afterwards, the UE may determine a small AP, which will be activated, among neighboring small APs by using CQI which is measured. If the AP which will be activated is determined, the UE may transmit an AP-ON message to the AP determined for activation through an uplink channel (for example, PUSCH).

3. Procedure of SCC (Small Cell Controller) in the Present Invention

In the present invention, the SCC can determine a small AP, which will be activated for next period of time Tb, based on the report messages transmitted from a plurality of UEs.

FIG. 7 illustrates an example of a report message fed back from a UE. Referring to FIG. 7, the report message fed back from the UE includes information on a transportable speed of a neighboring small AP, which is measured by the UE, and may be expressed as a matrix A. According to the embodiment of the present invention, the matrix indicated by the report message fed back from the UE may be used in accordance with two types. The two types may be represented by a '1 bit' type indicating transportability to the neighboring small AP as shown in FIG. 7(a) and an 'N bit' type indicating transportability to the neighboring small AP and a transportable speed as shown in FIG. 7(b). Hereinafter, an operation of the SCC in the present invention will be described with reference to FIG. 7.

3.1. Operation of SCC when Density of Small APs is Higher than that of UEs

First of all, it is assumed that small APs are arranged with a high density and UEs exist with a relatively low density. This assumption generally occurs in the UDN, a matrix A is determined such that the number of columns is more than the number of rows as the number (hereinafter, j) of small APs is more than the number (hereinafter, i) of UEs. Also, in this case, the matrix A may be characterized in a sparse matrix.

If the density of the small APs is higher than that of the UEs, the small AP, which will be activated, is determined explicitly.

3.2. Operation of SCC when Density of Small APs is Lower than that of UEs

A case where density of UEs is higher than that of small APs, for example, a case where a small number of macro cells serve a large number of UEs will be described. In this case, it is not easy to determine a set of small APs, which will be activated.

Therefore, the present invention suggests a matrix for determining a small AP, which will be activated by the SCC. Hereinafter, information included in the report message transmitted from the UE will be represented as a matrix A, and a matrix indicating a small AP, which will be activated in accordance with the embodiment of the present invention, will be represented as S. That is, each row of the matrix S represents the UE, and each column thereof represents the small AP. If $S_{ij}=1$, it indicates that UE(i) is connected to small AP(j), and if $S_{ij}=0$, it indicates that UE(i) is not connected to small AP(j). In the matrixes A and S, the number of UEs is I and the number of small APs is J.

In this case, the minimum number of small APs which will be activated is required, and an object function for maximizing throughput may be defined as expressed by the following Equation 1.

$$\max \cdot \sum_j \sum_i \frac{A_{ij} S_{ij}}{S_j} - \eta \sum_j P_j \times 1(S_j) \quad \text{[Equation 1]}$$

In this case, $$1(S_j) := \begin{cases} 1, \text{ if } S_j > 0 \\ 0, \text{ if } S_j = 0 \end{cases},$$

$S_j = \sum_{i=1}^{I} S_{ij}$, $\eta \in [0, \infty)$ is a tradeoff parameter between a transport speed and energy consumption, and $P_j$ is a power consumed by the small AP(j). Therefore, if $\eta$ is very great in the Equation 1, the minimum number of small APs which will be activated will be required.

3.3. Column-Row Elimination Procedure of SCC

FIG. 8 illustrates a method for determining a matrix S from a matrix A in accordance with a column-row elimination system according to the present invention.

Referring to FIG. 8, first of all, in the matrix A, AP j* for maximizing $\Sigma_i A_{ij}$ is activated and a column j* is eliminated (S801). Also, all UEs i (that is, the ith row) that may be connected to j* are eliminated (S803). Subsequently, a value corresponding to the row j* and the column i of the matrix S is updated (S805). Subsequently, the aforementioned steps are repeated such that an algorithm is performed until all the UEs are connected to the small APs, that is, until the matrix A is eliminated.

Hereinafter, the embodiment suggested in the present invention will be described in more detail.

3.3.1. Column-Row Elimination Procedure of SCC—AP First Procedure

First of all, an AP first activating procedure, that is, AP-First 1 Bit system and AP-First N Bits system will be described. In this case, the 1 Bit system indicates transportability only as described with reference to FIG. 7, and the N Bit system is defined to simultaneously indicate transportability to neighboring small AP and transportable speed.

FIG. 9 is a reference diagram illustrating an AP first activating procedure. The AP-first 1-bit case of the AP first procedure (AP-First 1-bit/N-bit algorithm) will be described with reference to FIG. 9 and Table 5. Among the respective small APs, a small AP, which enables transportable throughput per UE to be the greatest, is first activated.

TABLE 5

Repeated until A=∅:
$j^* = \text{argmax}_j \Sigma_i A_{ij}/\Sigma_i S_{ij}$
$S_{ij} = \begin{cases} 1, \text{ if } A_{ij^*} > 0 \\ 0, \text{ other wise} \end{cases}$
Eliminate column j* of matrix A (small AP j* is activated.)
Eliminate rows of matrix A that UE associated with AP j*

That is, in the matrix A, AP j* for maximizing $\Sigma_i A_{ij}$ is activated and the column j* is eliminated. Also, all UEs i (that is, the ith row) that may be connected to j* are eliminated. Subsequently, a value corresponding to the row j* and the column i of the matrix S is updated. Subsequently, the aforementioned steps are repeated such that an algorithm is performed until all the UEs are connected to the small APs, that is, until the matrix A is eliminated.

In case of the AP-First N-bit, in the matrix A, AP j* for maximizing $\Sigma_i A_{ij}$ is activated and the column j* is eliminated. Also, all UEs i (that is, the ith row) that may be connected to j* are eliminated. Subsequently, a value corresponding to the row j* and the column i of the matrix S is updated to a value n (n is a natural number) corresponding to the row j* and the column i of the matrix A. Subsequently, in the same manner as the AP-First 1-bit case, the aforementioned steps are repeated such that an algorithm is performed until all the UEs are connected to the small APs, that is, until the matrix A is eliminated.

3.3.2. Column-Row Elimination Procedure of SCC-UE First Procedure

FIG. 10 is a reference diagram illustrating a procedure of first considering a UE. Hereinafter, the procedure of first considering a UE, that is, UE-First 1 Bit system and UE-First N Bits system will be described. In this case, the 1 Bit system indicates transportability only as described with reference to FIG. 7, and the N Bit system is defined to simultaneously indicate transportability to neighboring small AP and transportable speed.

TABLE 6

Repeated until A=∅:
$i^* = \text{argmin}_i \Sigma_j A_{ij}$
$j^* = \text{argmax}_j \Sigma_i S_{ij}$
$S_{ij} = \begin{cases} 1, \text{ if } A_{ij^*} > 0 \\ 0, \text{ other wise} \end{cases}$
Eliminate column j* of matrix A (small AP j* is activated.))
Eliminate rows of matrix A that UE associated with AP j*

Referring to FIG. 10 and Table 6, in the UE first procedure, a UE that may be connected to the smallest number of APs is determined among UEs. Afterwards, among small AP candidates that may be connected to the determined UE, a small AP that may be connected to the largest number of UEs is activated.

That is, in the matrix A, UE i* for minimizing $\Sigma_j A_{ij}$ is determined Subsequently, among small APs that may be connected to the UE i*, AP j* for maximizing $\Sigma_i A_{ij}$ is activated and a column j* is eliminated. Also, all UEs i (that is, the ith row) that may be connected to j* are eliminated. Subsequently, a value corresponding to a row j* and a column i of the matrix S is updated to 1 (UE-First 1-bit system). Subsequently, the aforementioned steps are repeated such that an algorithm is performed until all the UEs are connected to the small APs, that is, until the matrix A is eliminated.

Likewise, the aforementioned UE-first 1-bit system may be applied to the UE-first N-bits system, and the value corresponding to the row j* and the column j of the matrix S may be updated to a value n (n is a natural number) corresponding to the row j* and the column i of the matrix A.

3.3.3. Column-Row Elimination Procedure of SCC—Proximity on Procedure

Alternatively, in the present invention, a matrix S may be generated in such a manner that UE activates a small AP, which provides the highest SINR (that is, throughput), and is connected to the small AP.

TABLE 7

Repeated until A=∅:
AP j* provides the best SINR to UE i.
$S_{ij} = \begin{cases} 1, \text{ if } A_{ij^*} > 0 \\ 0, \text{ other wise} \end{cases}$
Eliminate column j* of matrix A (small AP j*is activated.)
Eliminate rows of matrix A that UE associated with AP j*

Referring to Table 7, in the matrix A, AP j* that provides UE i with the highest SINR is activated, and a column j* is eliminated. Also, all UEs i (that is, the ith row) that may be connected to j* are eliminated. Subsequently, a value corresponding to a row j* and a column i of the matrix S is updated to 1. Subsequently, the aforementioned steps are repeated such that an algorithm is performed until all the UEs are connected to the small APs, that is, until the matrix A is eliminated.

3.3.4. Update Procedure of Matrix S of SCC

Also, when determining a matrix S of a small AP, which will be activated, in the object function of the Equation 1, instead of newly determining a matrix S through repeated steps, an update procedure through a change difference in a value of a matrix A with the lapse of time may be performed as follows.

That is, when the UE feeds a report message back every period of time, $A^{t-1}$ and $A^t$ will be defined as matrixes A at the time of t−1 and t, respectively. At this time, the matrix A is a matrix having the number of columns more than the number of rows, and is a sparse matrix. Therefore, if a difference between the matrixes A at different times is defined as $\Delta A = A^t - A^{t-1}$, a value of AA is changed only near a small AP j which is updated as the UE moves. (when determining an index j of the small AP, neighboring index j with regularity is given to neighboring small APs considering spatial distribution.) Therefore, a base station j* which will be activated at a period of time 't' is a base station ($j^* = \text{argmax}_j \Delta A_{ij}^t$) for maximizing a difference of the matrixes A, and has only to activate a small AP j* of $S_{j^*}=0$. That is, the base station activates the small AP j* in case of $F(A^t, S^t) < F(A^{t+1}, S^{t+1})$.

Figure 11:
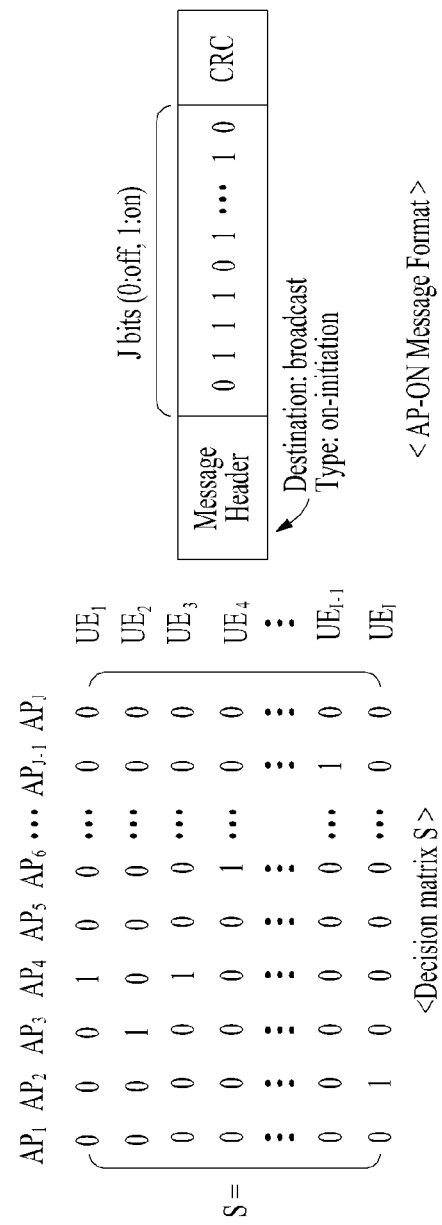
FIG. 11 is a reference diagram illustrating a matrix S determined using a column-row elimination procedure of SCC and an AP-ON message.

FIG. 11 is a reference diagram illustrating a matrix S determined using the aforementioned column-row elimination procedure of the SCC and an AP-ON message. As illustrated in FIG. 11, the matrix S is determined, and the SCC may broadcast information of the matrix S to small APs by using an AP-ON message type of FIG. 11.

3.4. Handover

Hereinafter, a method for performing handover of UE to an activated small AP will be described.

3.4.1. Normal Handover

As a method for using a legacy handover system (X2 based handover in 3GPP TS 23.401), a handover procedure in the standard after a small AP is activated is used. Handover in the 3GPP LTE standard includes procedures of handover preparation, handover execution, and handover completion. In the procedure of handover preparation, if the UE reports radio signal strength of a neighboring eNB channel to a serving base station (eNB), the serving base station makes handover decision to a target base station that provides a radio signal better than that of the serving base station. That is, the legacy handover system is applied to the present invention as it is, whereby compatibility with the legacy system can be maintained in the present invention.

3.4.2 Expedite Handover

The present invention suggests a handover method that uses a compressed procedure. That is, to activate a small AP which is deactivated, an AP-ON message is transmitted and at the same time handover decision is made. That is, the small AP is activated, and then handover decision is made immediately by skip of a procedure of measuring radio signal strength of a separate neighboring channel.

This is because that a neighboring radio signal state has been already observed in the procedure of activating the small AP and thus the repeated step may not be performed in the handover procedure. Therefore, it is advantageous in that the UE can be connected to the activated small AP while reducing signaling overhead and handover delay.

3.5 Throughput Improvement According to the Present Invention

Figure 12:
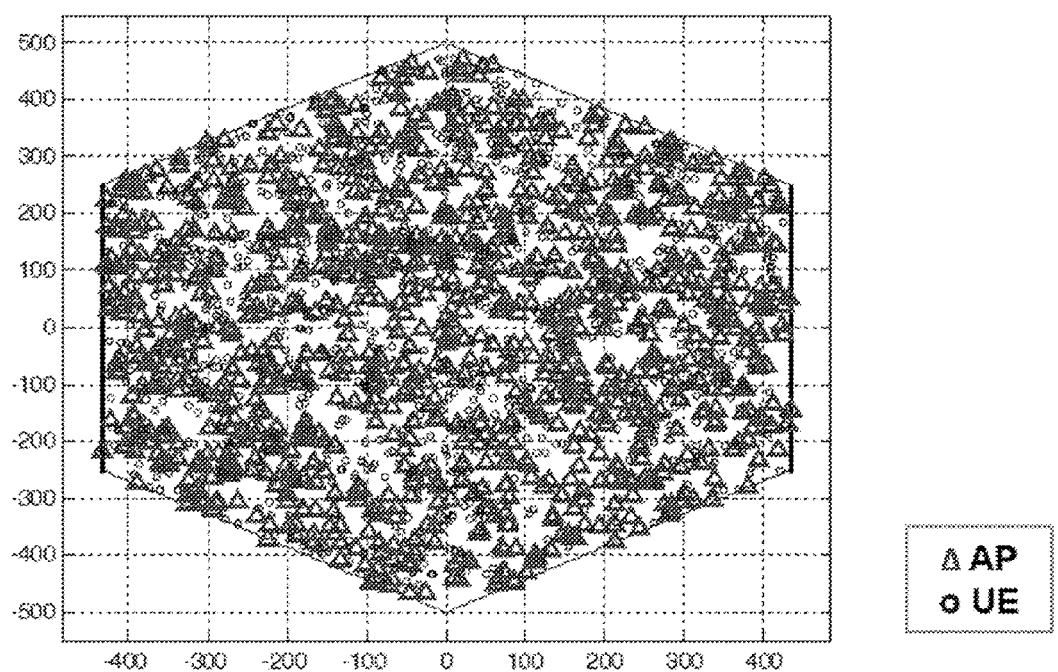
FIG. 12 is a reference diagram illustrating throughput of the present invention in a state that an AP and a UE are configured.

FIG. 12 is a reference diagram illustrating throughput of the present invention in a state that an AP and a UE are configured. In an environment as shown in FIG. 12, 1000 small APs are randomly arranged on a space within the same width (cell radius is 500 m) as coverage of one macro cell in accordance with uniform distribution. It is assumed that the aforementioned embodiments of the present invention are applied to the small APs. It is assumed that a transmission power of each small AP is 30 dBm and an operation power thereof is 1 W. IEEE 802.16m evaluation methodology document (EMD) has been used as a channel environment and parameter, and follows an indoor small office (light wall) scenario. In this scenario, it is considered that path loss is increased by a wall existing indoor every 10 m similarly to the small cell environment. Similarly to the arrangement of the small APs, each of 10 UEs, 50 UEs, 100 UEs, 500 UEs, 1000 UEs, 5000 UEs and 10000 UEs are randomly arranged within the same width as coverage of the macro cell in accordance with uniform distribution. All the small APs and UEs use a carrier frequency of 2 GHz and a bandwidth of 10 MHz in a co-channel environment.

A set of APs which will be activated has been determined through the aforementioned embodiment of the present invention, and cell connection (user association) of each UE has been determined. A total operation power has been calculated in accordance with the number of small APs which are activated. Also, Shannon formula of a unit bandwidth has been used to obtain throughput (unit: bits/sect/Hz) of the UE. Since a signal of a small AP of which SINR measured by the UE is −20 dB or less has throughput proximate to 0, it is assumed that throughput of the signal of the small AP is disregarded. Network throughput has been calculated by sum of throughput of each UE. In the embodiment of the present invention, an average value is obtained through a plurality of repeated experiments whenever the number of UEs is varied, and then its result may be represented as shown in FIG. 13.

Figure 13:
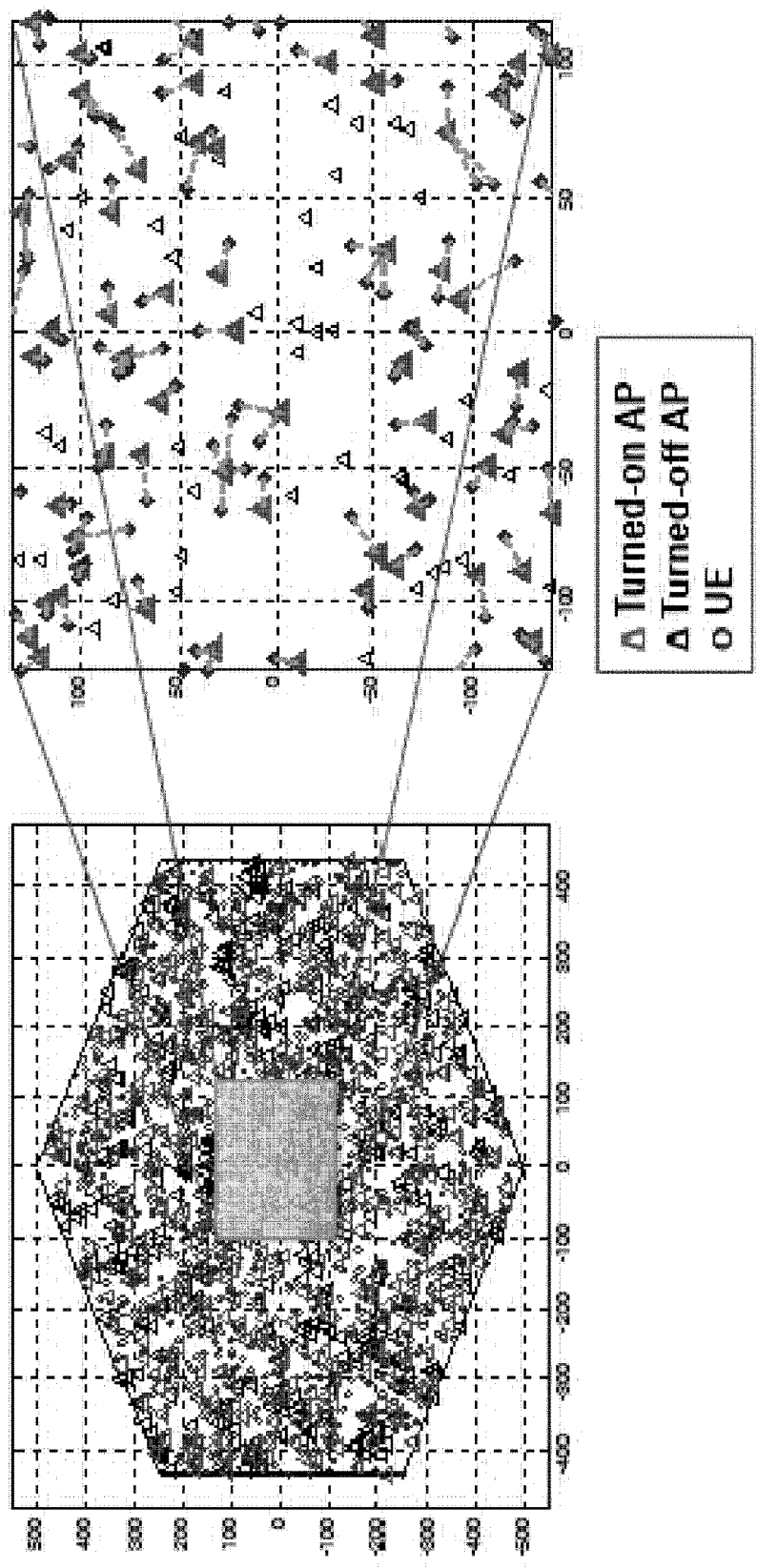
FIG. 13 illustrates the result of a proximity on algorithm operated in case of 1000 small APs and 1000 UEs.

FIG. 13 illustrates the result of a proximity on algorithm operated in case of 1000 small APs and 1000 UEs. Referring to FIG. 13, 574 of 1000 small APs are activated, and cell connection of each UE is represented as a dotted line in FIG. 13.

FIG. 14 illustrates network throughput based on the number of UEs and a change of network power consumption. In case of a baseline as illustrated in FIG. 14, if all the small APs are activated, certain power consumption is made and at the same time the number of UEs is increased, whereby network throughput is increased and converged. If Proximity On is used based on the baseline, a small AP that provides the best SINR is powered on, whereby a power smaller than that of the baseline is consumed if the number of UEs is smaller than the number of small APs, and at the same time network throughput similar to that of the baseline is obtained. However, if the number of UEs is more than the number of small APs, almost all of the small APs are powered on similarly to the baseline, whereby much power consumption is generated. Since the UE first 1 bit, UE first N bit, AP first 1 bit and AP first N bit serve to reduce the number of small APs which are activated, a power smaller than that of the case of the baseline and proximity ON is consumed and at the same time network throughput becomes lower than that of the case of the baseline and proximity ON. However, if density of UEs such as 1000 UEs is very high, the number of small APs which are activated is reduced, whereby interference between the small APs is reduced, and network throughput similar to or higher than that of the case of the baseline and proximity ON is achieved.

FIG. 15 illustrates a change of network energy efficiency based on the number of UEs. FIG. 15(a) illustrates that the number of UEs corresponds to a linear scale, and FIG. 15(b) illustrates that the number of UEs corresponds to a log scale.

Energy efficiency of the network is defined by transportable information (bits/Joule) per unit energy (1 Joule). Bits/Joule is a physical quantity such as bits/sec/power, and means a data transport speed per unit transmission power. In accordance with this definition, energy efficiency has been calculated using the result of network throughput and network power consumption described as above. As a result, if the number of UEs is 2000 or more, it is noted that energy efficiency is uniformly converged in all cases including the baseline and proximity ON. In order to observe an energy efficiency aspect of this DANCE algorithm, it is required to review a case where the number of UEs is less than 1000. If density of UEs is similar to or lower than density of small APs, it is noted that energy efficiency is very high as compared with the case of the baseline. For example, if the number of UEs is 100, energy efficiency of about 10 times can be achieved.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In this specification, a specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above detailed description is to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The aforementioned support method for increasing energy efficiency in a self-organization network (SON) and the device for the same may be applied to various wireless communication systems.

The invention claimed is:

1. A wireless communication system comprising:
a plurality of access points (APs);
a plurality of user equipments (UEs); and
a macro cell,
wherein the macro cell is configured to receive feedback including a first matrix comprising connection information between identifiers of the plurality of APs and the plurality of UEs, generate a second matrix including information on a specific AP to be activated, the specific AP being determined on the basis of the first matrix, and broadcast the generated second matrix, and wherein the specific AP is determined by an Equation A for maximizing throughput,
[Equation A]
max.

$$\sum_j \sum_i \frac{A_{ij} S_{ij}}{S_j} - \eta \sum_j P_j \times 1(S_j),$$

where, i is an index of UE, j is an index of AP, Aij is a value corresponding to the index of the UE and the index of the AP in the first matrix, Sij is a value corresponding to the index of the UE and the index of the AP in the second matrix, $$1(S_j) := \begin{cases} 1, \text{ if } S_j > 0 \\ 0, \text{ if } S_j = 0 \end{cases},$$

$S_j = \sum_{i=1}^{I} S_{ij}$, (in this case, I is the number of all UEs), $\epsilon[0,\infty)$ is a tradeoff parameter between a transport speed and energy consumption, and $P_j$ is a power consumed by a small AP(j).

2. The wireless communication system according to claim 1, wherein at least one of the plurality of APs is activated per predetermined period and configured to transmit a beacon message and identify the generated second matrix.

3. The wireless communication system according to claim 2, wherein at least one of the plurality of APs performs turn-off if it does not correspond to the specific AP included in the generated second matrix.

4. The wireless communication system according to claim 1, wherein each of the plurality of UEs is configured to receive the beacon message from the plurality of APs and feed a report message, which includes at least one of connectivity and transportable speed, back to each AP.

5. The wireless communication system according to claim 1, wherein each of the plurality of UEs is configured to identify whether to receive the beacon message of the AP and determine whether to perform handover if the beacon message can be received.

6. The wireless communication system according to claim 1, wherein the second matrix is characterized in that a value simultaneously corresponding to both a first AP of which transportable throughput to the plurality of UEs is maximum and a first UE associated with the first AP is set to 1 based on the first matrix.

7. The wireless communication system according to claim 1, wherein the second matrix is characterized in that a value simultaneously corresponding to both a second UE that may be connected to a minimum number of APs and a second AP that may be connected to a maximum number of UEs among APs connected to the second UE is set to 1 based on the first matrix.

8. The wireless communication system according to claim 1, wherein the second matrix is characterized in that a value corresponding to an AP that provides the highest throughput to a specific UE is set to 1 based on the first matrix.

9. The wireless communication system according to claim 1, wherein the macro cell is configured to transmit a message indicating handover when broadcasting the generated second matrix.

* * * * *